United States Patent [19]

D'Ambrosio

[11] Patent Number: 5,711,638
[45] Date of Patent: Jan. 27, 1998

[54] SYSTEM FOR DEPLOYING CABLE HAVING NODES INTO A FLUID MEDIUM AND A BLOWOUT PREVENTER

[75] Inventor: Michael A. D'Ambrosio, Arnold, Md.

[73] Assignee: Northrop Grumman Corporation, Los Angeles, Calif.

[21] Appl. No.: 571,335

[22] Filed: Dec. 13, 1995

[51] Int. Cl.⁶ .................. F16L 1/18; B63B 35/04
[52] U.S. Cl. .......... 405/168.3; 405/168; 405/168.1; 405/168.4
[58] Field of Search ................ 405/158, 166, 405/168.1–168.4, 169, 170, 171; 166/338, 350, 359, 367

[56] References Cited

U.S. PATENT DOCUMENTS

| | | | |
|---|---|---|---|
| 3,680,342 | 8/1972 | Mott et al. | 405/168.3 X |
| 3,685,306 | 8/1972 | Mott | 405/168.3 |
| 3,911,689 | 10/1975 | Hogan | 405/168.1 X |
| 5,348,423 | 9/1994 | Maloberti et al. | 405/168.4 X |

*Primary Examiner*—Dennis L. Taylor
*Attorney, Agent, or Firm*—Walter G. Sutcliff

[57] ABSTRACT

The system for deploying cable having nodes according to the present invention includes a tubular member, first and second restrictors, and a controller. The cable having nodes travels through the tubular member from a cable supply point to a deployed point. The deployed point is a fluid medium at a higher pressure than the cable supply point. The first and second restrictor form part of the tubular member with the second restrictor being disposed closer to the deployed point. The first and second restrictor have at least a first and second operating position. In the first operating position the restrictors allow the cable to pass, and in the second operating position the restrictors allow both the cable and the nodes to pass. Depending on their operating state, the first and second restrictor restrict the flow of the fluid medium through the tubular member. The controller controls whether the first and second restrictor are in the first and second operating position. The first and second restrictor may, for example, be multi-port blowout preventers.

14 Claims, 2 Drawing Sheets

5,711,638

SYSTEM FOR DEPLOYING CABLE HAVING NODES INTO A FLUID MEDIUM AND A BLOWOUT PREVENTER

BACKGROUND OF THE INVENTION

1. Field of the Invention

The present invention relates to a system for deploying cable into a fluid medium and a blowout preventer for use therein, but not limited to use therein; and more particularly, to a system for deploying a cable having nodes into a fluid medium.

2. Description of the Related Art

Conventional systems for deploying cable having nodes into bodies of water do so from a stationary platform or the deck of a ship above the surface of the body of water. As such, these systems and the cable being deployed are subject to the environment, and events taking place on the surface of the body of water. There exists a demand for systems which can deploy cable having nodes into the body of water wherein the entry point into the body of water is below the surface of the water. In this manner, the cable deployment system and the cable are not subject to surface events or environmental conditions above the surface of the water.

SUMMARY OF THE INVENTION

The present invention satisfies the above discussed demand, but is not limited to deploying cable below the surface of a body of water. Therefore, one object of the present invention is to provide a system for deploying cable having nodes into a fluid medium.

A further object of the present invention is to provide a system for deploying cable having nodes into a fluid medium below a surface thereof, and wherein the fluid medium is at a higher pressure than the system.

An additional object of the present invention is to provide a system for deploying cable having nodes into a fluid medium which minimizes the flow of the fluid medium through system.

Another object of the present invention is to provide a system for deploying cable having nodes into a fluid medium wherein the system includes blowout preventers and a means for guiding nodes through the blowout preventers.

A further object of the present invention is to provide a blowout preventer having an improved response.

Another objective of the present invention is to provide a system for deploying cable having nodes into a fluid medium which includes at least one blowout preventer having an improved response.

These and other related objects of the present invention are achieved by providing a system for deploying cable having nodes, comprising: a tubular member through which a cable having nodes travels from a cable supply point to a deployed point, said deployed point being a medium at a higher pressure than said cable supply point; a first restrictor forming a part of said tubular member, said first restrictor having at least a first and second operating position, said first operating position allowing said cable to pass through said first restrictor, said second operating position allowing both said cable and said nodes to pass through said first restrictor; a second restrictor forming a part of said tubular member and being disposed closer to said deployed point than said first restrictor, said second restrictor having at least a first and second operating position, said first operating position allowing said cable to pass through said second restrictor, said second operating position allowing both said cable and said nodes to pass through said second restrictor; and control means for controlling whether said first and second restrictor are in said first and second operating position.

These and other related objects of the present invention are further achieved by providing the above described system wherein said first and second restrictor are single acting blowout preventers, single acting multi-port blowout preventers, double acting blowout preventers, or double acting blowout preventers each having a plurality of first and second ports, said first ports supplying hydraulic fluid to close said double acting blowout preventer, and said second ports supplying hydraulic fluid to open said double acting blowout preventer.

The objects of the present invention are also achieved by providing a blowout preventer comprising: an annular housing having an axial bore; an annular sphincter disposed in said housing and having an axial bore, said axial bore of said sphincter forming a portion of said axial bore of said annular housing; an annular piston surrounding a portion of said annular sphincter, said annular piston and said annular housing defining a first chamber which when filled with hydraulic fluid causes said annular piston to move in a first axial direction and compress the annular sphincter; and wherein said annular housing includes a plurality of first radial ports for supplying hydraulic fluid to said first chamber.

Other objects, features, and characteristics of the present invention; methods, operation, and functions of the related elements of the structure; combination of parts; and economies of manufacture will become apparent from the following detailed description of the preferred embodiments and accompanying drawings, all of which form a part of this specification, wherein like reference numerals designate corresponding parts in the various figures.

DETAILED DESCRIPTION OF THE PREFERRED EMBODIMENTS

Figure 1:
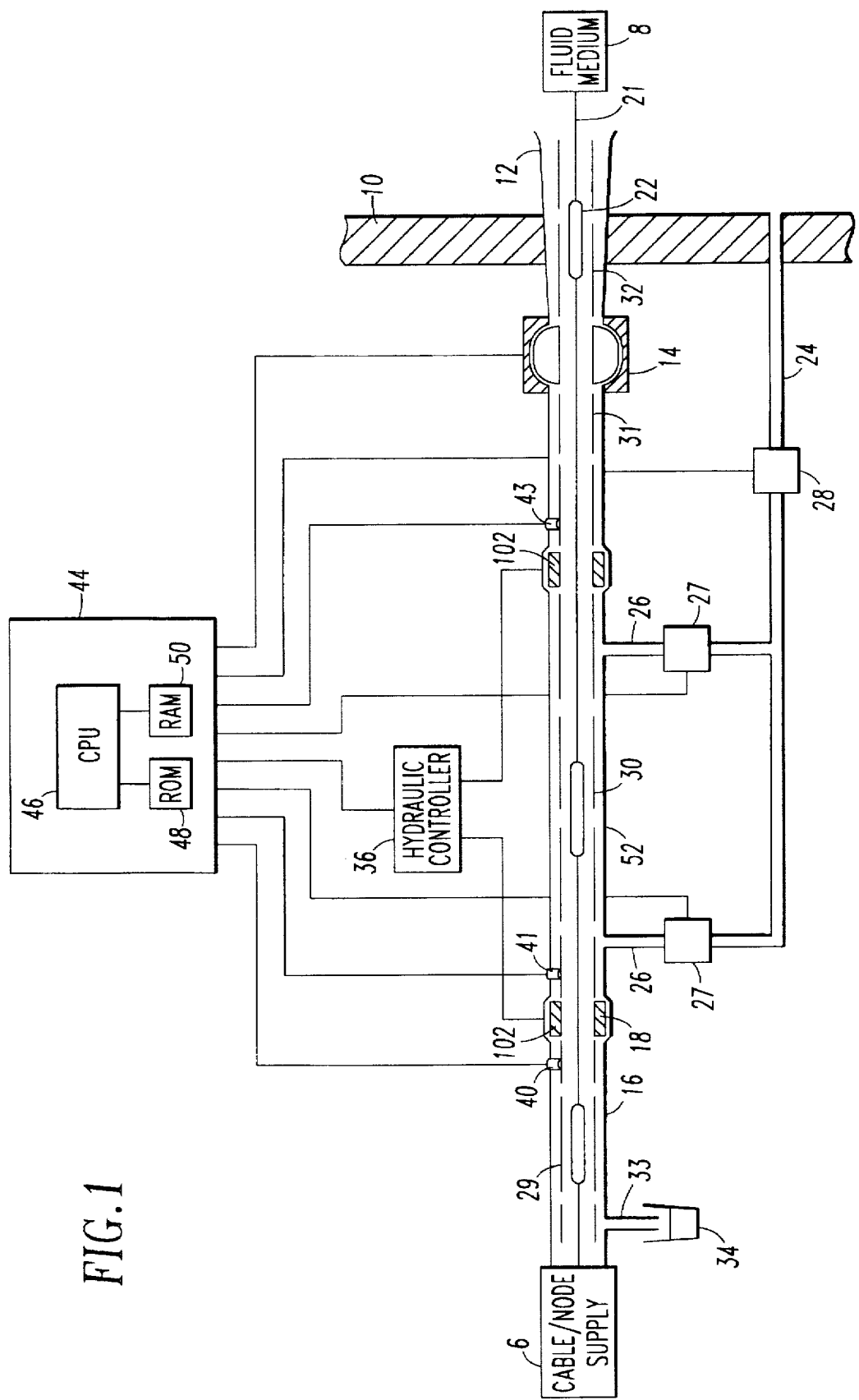
FIG. 1 illustrates a system for deploying cable according to the present invention.

FIG. 1 illustrates one embodiment of the system for deploying cable according to the present invention. The system may be mounted in any type of stationary or moving structure (hereinafter referred to as the "mounting structure") such as a platform, a submerged towed vehicle, a submerged autonomous vehicle, a manned submersible, or a surface ship. As illustrated in FIG. 1, the system deploys a cable 21 having nodes 22 from a cable/node supply 6 through a pressure bulkhead 10 into a fluid medium 8. The fluid medium 8 may be any fluid at a higher pressure than the pressure in the system. The term cable should be broadly construed such that the cable 21 may be any type of line, transmission line, optical fiber, rope, etc. formed of any material. Similarly, the term node should be broadly construed such that each of the nodes 22 may be any structure connected to the cable 21 having a larger diameter or diagonal than that of the cable 21. For instance, a node 22 may be a sensor, a splice, an amplifier, etc. The cable/node supply 6 may be any type of well-known system for delivering cable such as a cable on a spool. It should further be understood that the present invention may be used to deploy a cable which does not include the nodes 22.

As illustrated in FIG. 1, the system for deploying cable according to the present invention includes a tubular member 16 leading from the cable/node supply 6 to a first of two ends of a ball valve 14. A discharge tube 12 leads from the second end of the ball valve 14 through the pressure bulkhead 10 to the fluid medium 8. A first blowout preventer (BOP) 18 and a second BOP 20 form a part of the tubular member 16. The first and second BOPs 18 and 20 define a portion of the tubular member 16 therebetween called a transit portion 52. Perforated or slotted guide tubes 29–32 are disposed within the tubular member 16. The guide tubes 29–32 are slotted so that the fluid medium 8 can freely flow therethrough. The guide tube 29 leads from the cable/node supply 6 to the first BOP 18, the guide tube 30 leads from the first BOP 18 to the second BOP 20, the guide tube 31 leads from the second BOP 20 to the ball valve 14, and the guide tube 32 leads from the ball valve 14 to the end of the discharge tube 12.

A drain pipe 33 leads from an end of the tubular member 16 closest to the cable/node supply 6 to a drain tank 34. Ancillary compensation lines 26 are connected to the transit portion 52 at a first position near the first BOP 18 and at a second position near the second BOP 20 as illustrated in FIG. 1. A control valve 27 is disposed along each of the pressure compensation lines 26. A line 24 and a control valve 28 connect the pressure compensation lines 26 to the fluid medium 8.

Figure 2:
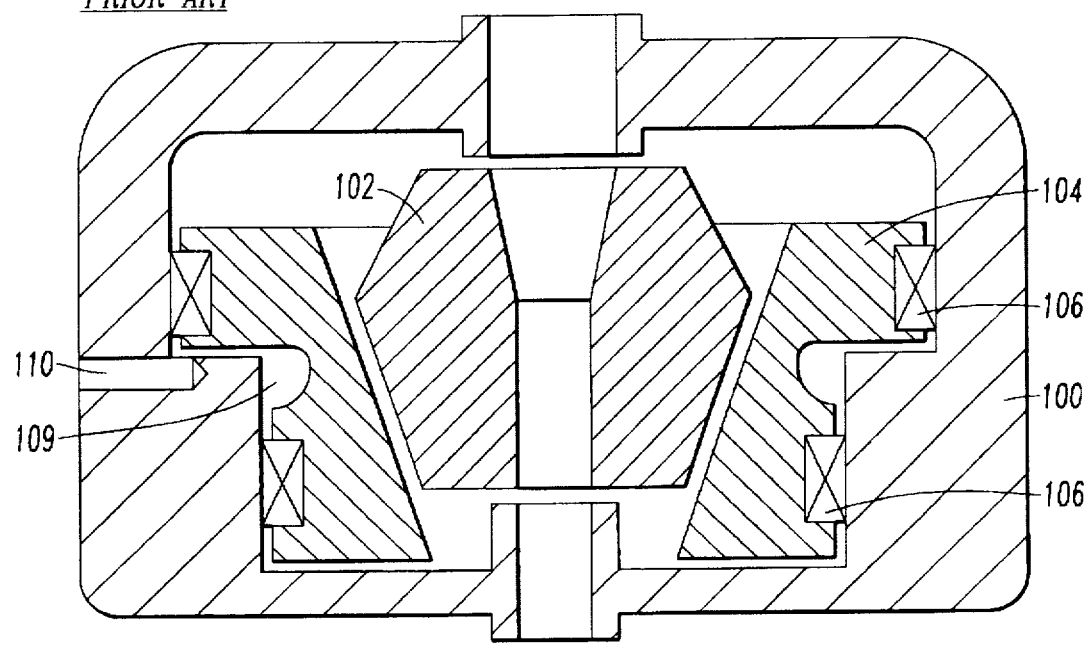
FIG. 2 illustrates a conventional single acting blowout preventer.
Figure 3:
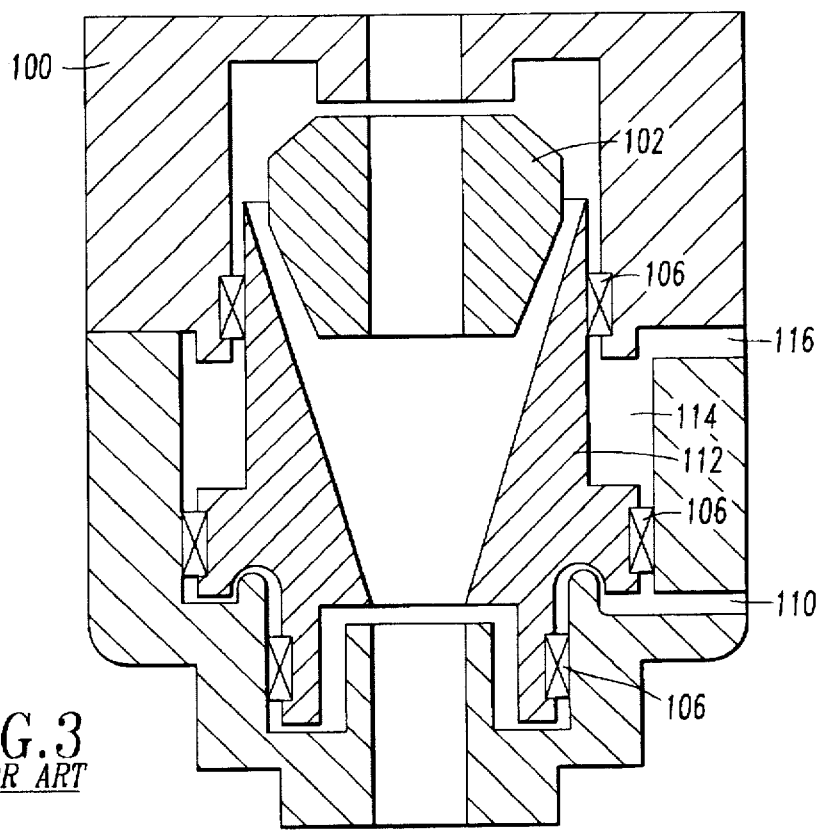
FIG. 3 illustrates a conventional double acting blowout preventer.

In one embodiment of the present invention, the first and/or second BOPs 18 and 20 are hydraulic devices. For instance, the first and second BOPs 18 and 20 can be a single acting BOP or a double acting BOP. FIG. 2 illustrates an example of a single acting BOP such as made by Hydril Corporation. FIG. 3 illustrates an example of a conventional double acting BOP. Hydril Corporation also produces double acting BOPs having the structure as illustrated in FIG. 3. Of course if the desired size of the single or double acting BOP is not available, the proper sized BOP will have to be manufactured; but will have the structure as shown in FIG. 2 or FIG. 3.

The single acting BOP illustrated in FIG. 2 includes a housing 100 have an axial bore. The diameter of the bore being of appropriate size for coupling to the tubular member 16. A sphincter or packing unit 102 forms a portion of the axial bore. The sphincter 102 is typically made of rubber or a suitable elastomer. An annular piston 104 surrounds a portion of the sphincter 102. A single port 110 supplies hydraulic fluid to a chamber 109, defined by the piston 104 and the housing 100, to actuate the piston 104. The piston 104 includes seals 106 to prevent the hydraulic fluid from leaking. During operation, hydraulic fluid is supplied via port 110 to the single acting BOP. The supply of hydraulic fluid causes the piston 104 to move axially (upwards in the drawing of FIG. 2). As piston 104 moves, the piston 104 squeezes the sphincter 102 closing the axial bore through the sphincter 102. The diameter of the axial bore through the sphincter 102 can, therefore, be set by controlling the pressure of the hydraulic fluid. As the hydraulic fluid pressure is reduced, the elastic nature of the sphincter 102 causes the sphincter 102 to expand. The expansion of the sphincter 102 forces the piston 104 to move axially (downwards in the drawing of FIG. 2) which in turn forces the hydraulic fluid out of the port 110 and results in an increase in the diameter of the axial bore of the sphincter 102.

The double acting BOP illustrated in FIG. 3 includes the same components as the single acting BOP except that the piston 112 replaces the piston 104. The piston 112 of the double acting BOP defines an additional chamber 114. Another port 116 leads to the chamber 114 and supplies hydraulic fluid to the chamber 114. During operation, the hydraulic fluid supplied by the port 110 causes the piston 112 to move axially and close the sphincter 102, while the hydraulic fluid supplied by the port 116 causes the piston 112 to move axially and allow the sphincter 102 to open. Since the double acting BOP does not rely on the elasticity of the sphincter 102 to force the piston 112 to move, the sphincter 102 opens much more quickly.

The action or response of the single acting and double acting BOP can further be increased by providing additional ports to the chambers 109 and 114. In one embodiment, two additional ports positioned 120 degrees circumferentially from the port 109 on either side thereof were added to increase the opening response time of the single acting BOPs. Unfortunately, the seals 106 failed under these conditions, and were replaced with Double Delta II seals (part no. s30662-449-5) produced by Shambam Corporation.

The hydraulic controller 36 controls the operation of the first and/or second BOPs 18 and 20. Instead of being hydraulically controlled devices, the first and/or second BOPs 18 and 20 can be electronically controlled, wherein the hydraulics are replaced by solenoids in the well-known manner. In this embodiment, the hydraulic controller 36 can be eliminated.

The hydraulic controller 36, the control valves 27 and the control valve 28 operate under the control of a controller 44. Optionally, as discussed below, the control valves 27 can be operated manually. The controller 44 includes a CPU 46, a ROM 48 and a RAM 50. The ROM 48 stores a program which controls the operation of the CPU 46. The CPU 46, under control of this program, inputs data from the sensors 40 and 41 disposed along the tubular member 16 before and after the first BOP 18 and a sensor 43 disposed after the second BOP 20. The sensors 40, 41, and 43 detect the nodes 22, and may be, for example, electromagnetic sensors which detect an electromagnetic disturbance caused by the passage of the nodes 22. The sensors 40, 41, and 43 are not limited to electromagnetic sensors, however, and may be any type of sensor which can detect the presence or passing of the nodes 22.

The CPU 46 stores the data output by the sensors 40, 41 and 43 in RAM 50, generates control signals based on this data, and outputs the control signals to the hydraulic controller 36, the control valves 27 and the control valve 28 to control the operation thereof. Intermediate data produced by the CPU 46 during operation is also stored in RAM 50. Instead of a programmed computer, the controller 44 may be formed of logic circuits or a combination of logic circuits and a programmed computer.

The operation of the present invention will now be described. The cable/node supply 6 supplies the cable 21 having nodes 22 to the tubular member 16. The diameter of the tubular member 16 is large enough to allow the fluid medium 8 to freely flow around the cable 21 and the nodes 22, and to allow smooth passage of the cable 21 and the nodes 22 through the tubular member 16.

Several different methods exist for initiating the deployment of the cable 21 having the nodes 22. For instance, the start end of the cable 21 can be attached to a weight, and due to the mounting of the system, gravity initially pulls the cable 21 through the system. Alternatively, the cable 21 having a weight attached to the start end may be positioned so that the weight lies between the pressure bulkhead 10 and a second pressure bulkhead (not illustrated). The second pressure bulkhead would include a controllable opening to the fluid medium 8. By (1) opening the second pressure bulkhead and (2) supplying an impulse of fluid medium to the section of the discharge tube 12 between the two pressure bulkheads and behind the weight to obtain a pressure greater than the pressure of the fluid medium 8, the cable 21 can be initially deployed. It should be understood that the initial deployment methods discussed above are merely examples, and that any method for initially deploying the cable 21 can be used.

As illustrated in FIG. 1, the cable/node supply 6 supplies the cable 21 having nodes 22 to the guide tube 29 disposed in the tubular member 16. The guide tubes 29–32 serve to align the nodes with the first and second BOPs 18 and 20 and the ball valve 14.

The guide tube 29 aligns the node 22 with the opening of the sphincter 102 in the first BOP 18. Absent, for example, the guide tube 29, the node 22 could move within the tubular member 16, and become misaligned with the opening of the sphincter 102. When misaligned, the node 22 will come into contact with the end of the sphincter 102, and can even become jammed at the opening of the sphincter 102. Either event can cause the cable 21 to break or can damage the node 22. The guide tubes 29–32 serve to prevent such occurrences. As described above, the guide tubes 29–32 are perforated to allow the fluid medium 8 to freely enter the guide tubes 29–32, and act equally on the cable 21 and the nodes 22. This reduces the likelihood of unequal forces acting on the cable 21 and the nodes 22. Accordingly, perforating the guide tubes 29–32 reduces the possibility of the cable 21 breaking or the nodes 22 becoming damaged.

Additionally, in a preferred embodiment, the first BOP 18 has a shorter length than that of the nodes 22 such that an end of a node 22 leaving the first BOP 18 will enter the guide tube 30 prior to the other end of the node 22 leaving the guide tube 29 and entering the first BOP 18. A similar relationship exists between the guide tubes 30 and 31 and the second BOP 20. Also, a similar relationship exists between guide tubes 31 and 32 and the ball valve 14.

During cable deployment, the ball valve 14 is opened to allow the passage of the cable 21 and the nodes 22. Consequently, the ball valve 14 also allows the fluid medium 8 to pass into the tubular member 16 and the guide tube 31. The fluid medium 8 flows into the tubular member 16 and the guide tube 31 since the fluid medium 8 is at a higher pressure than the pressure in the tubular member 16. The first and second BOPs 18 and 20 serve to minimize the amount of the fluid medium 8 which can flow through the tubular member 16.

As described above, each of the first and second BOPs 18 and 20 includes a sphincter 102, and operates under the control of the controller 44. The controller 44 causes the sphincters 102 of the first and second BOPs 18 and 20 to achieve either an open or closed position. In the Closed position, the controller 44 sets the axial bore of the sphincters 102 slightly larger than the diameter of the cable 21. Specifically, the controller 44 sets the diameter of the axial bore to allow the cable 21 to smoothly and freely pass therethrough. In the open position, the controller 44 sets the axial bore of the sphincters 102 larger than the diameter or diagonal of the node 22 to allow the cable 21 and the node 22 to smoothly and freely pass. The diameter of the axial bore set by the controller 44 in the open position will depend on the size of the node 22 and the strength of the cable 21 as discussed in detail below.

At the start of operation, the controller 44 instructs the hydraulic controller 36 to place both the first and second BOPs 18 and 20 in the closed position. Then, the ball valve 14 is opened. The cable 21 is then initially deployed into the fluid medium 8 as discussed above. The cable 21 then moves through the system due to, for example, gravity or movement of the mounting structure.

In the embodiment illustrated in FIG. 1, a sensor 40, such as an electromagnetic sensor, detects that the node 22 is approaching the first BOP 18, and outputs a signal to the controller 44. When a node 22 approaches the first BOP 18, the controller 44 instructs the hydraulic controller 36 to place the first BOP 18 in the open position. Since the second BOP 20 remains in the closed position, the ingestion of the fluid medium 8 is minimized. Accordingly, as the node 22 passes through the sphincter 102 of the first BOP 18, the pressure differential between each end of the node 22 will be quite small. Therefore, the sphincter 102 of the first BOP 18 only has to be opened enough to allow the node 22 to pass. The reason for this will become clearer from the discussion below regarding the operation of the second BOP 20. After the node 22 passes through the first BOP 18, a sensor 41 detects that the node has passed through the first BOP 18. In response to the output of the sensor 41, the controller 44 instructs the hydraulic controller 36 to place the first BOP 18 in the closed position.

After the controller 44 places the first BOP 18 in the closed position, the controller 44 instructs the hydraulic controller 36 to place the second BOP 20 in the open position to reduce the pressure differential across the sphincter 102 of the second BOP 20. Assume that the pressure of each end of the sphincter 102 of the second BOP 20 is $P_2$ and $P_1$, respectively, with $P_1$ being the pressure at the end of the sphincter 102 closest to the fluid medium 8. Then, the force F acting on the end of the node 22 entering the sphincter 102 equals $(P_1-P_2) A$ where A is the area of the end of the node 22. Since this force F may be orders of magnitude greater than the tensile strength of the cable 21, the force F can easily cause the cable 21 to break. To reduce the pressure differential across the node 22, the second BOP 20 is placed in the open position before the arrival of the node 22. This allows the fluid medium 8 to flow into the transit portion 52. This causes the pressure $P_2$ at the transit portion 52 side of the second BOP 20 to increase. The greater the amount of the fluid medium 8 which flows into the transmit portion 52 before the node enters the sphincter 102 of the second BOP 20 the lower the pressure differential. Therefore, it is preferable to open the second BOP 20 as soon as possible, which is after the first BOP 18 closes.

Furthermore, the opening of the sphincter 102 of the second BOP can be controlled to insure that fluid medium 8 flowing into the transit portion 52 does not create a pressure differential across the node 22 in the transit portion having sufficient force to break the cable 21 or damage the node 22. As one skilled in the art will recognize, the diameter of the tubular member 16 may contribute to the pressure differential across the node 22 and the pressure on the transit portion 52 side of the second BOP 20 (i.e., fluid flowing through a larger diameter tube will induce less pressure differential than fluid flowing through a smaller diameter tube with respect to the diameter of the node 22). For similar reasons, one skilled in the art will also recognize that the diameter of the sphincter 102 of the second BOP 20 contributes to the pressure differential across a node 22 passing through the sphincter 102.

Furthermore, the longer the node 22 takes to travel from the first BOP 18 to the second BOP 20 (hereinafter the "transit time"), the more time available for the fluid medium 8 to flow into the transit portion 52 reducing the pressure differential across the second BOP 20. The transit time can be increased by slowing the cable deployment speed. Additionally, and preferably, the transit time can be increased by placing the first and second BOPs 18 and 20 as far from each other as the system constraints allow. System constraints are, for example, the size of the mounting structure or that portion of the mounting structure available for mounting the system. Therefore, the tubular member 16, the opening of the sphincter 102 of the second BOP 20, and the transit time should be set to keep the forces caused by the above discussed pressure differentials within acceptable limits (i.e., at least less than the tensile strength of the cable 21).

Of further concern is the dynamic forces applied by the fluid medium 8 to the node 22. These forces, also dependent on pressure should be kept sufficiently low to prevent the cable 21 from breaking and/or the node 22 from being damaged.

To further reduce the pressure differentials and the dynamic forces, the system of the present invention can be provided with the compensation lines 26, the control valve 27, the control valve 28, and the line 24. Before the second BOP 20 is placed in the open position, the controller 44 instructs the control valve 28 to open. When the control valve 28 opens, the fluid medium 8 flows through the line 24, the control valve 28, the control valves 27 and the pressure compensation lines 26 into the transit portion 52. The flow rate of the fluid medium 8 into the transit portion 52 via the pressure compensation lines 26 is set based on various factors including, but not limited to, the desired transit time, the length and size of the transit portion 52, and the acceptable pressure differentials.

Furthermore, in a preferred embodiment, the pressure compensation lines 26 connect to the transit portion 52 at either end as shown in FIG. 1. Thus, when the fluid medium 8 flows into the transit portion 52 via the compensation lines 26, a node 22 will experience a desired pressure increase but with a minimal pressure differential; and hence, minimal tensile forces imposed on the cable 21 by the node 22. By supplying the fluid medium 8 at both ends of the node 22, the forces acting on the node 22 do so in a more uniform manner. Compared to an arrangement where the pressure compensation lines or line 26 supply the fluid medium 8 at only one end of the transit portion 52, the arrangement of the pressure compensation lines 26 in FIG. 1 further reduces the chance that fluid medium 8 flowing into the transit portion 52 via the pressure compensation lines 26 will break the cable 21 or damage the node 22.

Also, in a preferred embodiment, a control valve 27 is provided along each of the pressure compensation lines 26. By controlling the operation of the control valves 27, the controller 44 can independently control the flow rate of the fluid medium 8 through each of the pressure compensation lines 26. The use of the control valves 27, however, is not always required, and instead of being controlled by the controller 44, the control valves 27 may be manually controlled. It should also be understood that the present invention is not limited to the system illustrated in FIG. 1, and any number of pressure compensation lines 26 in any arrangement may be provided; including no pressure compensation lines 26.

Once the node 22 passes through the second BOP 20, the node 22 is detected by the sensor 43. In response to the output of sensor 43, the controller 44 instructs the hydraulic controller 36 to place the second BOP 20 in the closed position. The controller 44 also closes the control valve 28. At this point, both the first and second BOPs 18 and 20 will be in the closed position. Based on the length of the nodes 22 and spacing between nodes 22, the first and second BOPs 18 and 20 are positioned so that nodes 22 do not approach and pass through the first and second BOPs 18 and 20 at the same time. Thus, one of the first and second BOPs 18 and 20 will be in the closed position at all times, and the flow of the fluid medium 8 through the tubular member 16 is minimized.

Since the first and second BOPs 18 and 20 do not totally prevent the fluid medium 8 from flowing through the tubular member 16 and the guide tubes 29–30, a drain pipe 33 and a drain tank 34 are provided near the cable supply end of the tubular member 16. The fluid medium 8 passing through the first BOP 18 flows through the drain pipe 33 and into the drain tank 34 as opposed to passing into the mounting structure. Alternatively, the drain pipe 33 could serve as a discharge line and be connected to, for example, a pump.

The particular application, the cable 21 and the nodes 22 determine the size, length and thickness of the components comprising the system for deploying cable according to the present invention. For instance, consider the application of deploying cable into the ocean. In this application, the components comprising the system of the present invention which come into contact with the ocean water should, preferably, be made of corrosion resistant materials such as stainless steel. Additionally, the stress the components will have to withstand will depend on the depth, and thus the pressure, to which the components will be subjected. Accordingly, these factors will govern such specifications as the thickness of, for example, the tubular member. All of these specifications are readily determinable by one skilled in the art given the desired application, the cable 21 and the nodes 22.

The cable deployment system of the present invention may operate according to several different control strategies. In the system illustrated in FIG. 1, the sensors 40 and 41 detect nodes 22 approaching and leaving the first BOP 18 and the sensor 43 detects the nodes 22 leaving the second BOP 20. Based thereon, the controller 44 causes the first and second BOPs 18 and 20 to open and close. Alternatively, a sensor to detect the nodes 22 could be added before the second BOP 20, and the controller 44 could be programmed with the deployment speed and the specifications of the system (e.g., length of the first and second BOPs 18 and 20, length of a node 22, etc). Then, the controller 44 could open the first and second BOPs 18 and 20 and the control valves 27 and 28 based on the output of the sensors and a determination of the length of time required for the node 22 to travel through the first and second BOPs 18 and 20. Thus, the sensors 41 and 43 could be eliminated in this alternative embodiment.

As a further alternative, the use of sensors could be eliminated entirely. If the controller 44 is programmed with the spacing of the nodes 22 along the cable 21, then based on the speed of cable deployment and the specifications of the system, the controller 44 can calculate when a node will reach and pass through the first and second BOPs 18 and 20. The controller 44 could then control the first and second BOPs 18 and 20 and the control valves 27 and 28 in accordance with those calculations.

The above control strategies have merely been given as examples. It should be understood that many other control strategies exist, and that the operation of the present invention is not limited to any one control strategy.

While the invention has been described in connection with what is presently considered the most practical and preferred embodiments, it is to be understood that the invention is not limited to the disclosed embodiments, but on the contrary, is intended to cover various modifications and equivalent arrangements included within the spirit and scope of the appended claims.

What is claimed:

1. A system for deploying cable having nodes, comprising:

a tubular member through which a cable having nodes travels from a cable supply point to a deployed point, said deployed point being a medium at a higher pressure than said cable supply point;

a first restrictor forming a part of said tubular member, said first restrictor having at least a first and second operating position, said first operating position allowing said cable to pass through said first restrictor, said second operating position allowing both said cable and said nodes to pass through said first restrictor;

a second restrictor forming a part of said tubular member and being disposed closer to said deployed point than said first restrictor, said second restrictor having at least a first and second operating position, said first operating position allowing said cable to pass through said second restrictor, said second operating position allowing both said cable and said nodes to pass through said second restrictor; and control means for controlling whether said first and second restrictor are in said first and second operating position.

2. The system of claim 1, wherein said control means controls said first and second restrictor so that when said first restrictor is in said second operating position, said second restrictor is in said first operating position, and when said second restrictor is in said second operating position, said first restrictor is in said first operating position.

3. The system of claim 1, further comprising:

guide tubes disposed within said tubular member for aligning said nodes with said first and second restrictor.

4. The system of claim 3, wherein said nodes have a length greater than a length of said first and second restrictor such that said guide tubes align a first end of a node closer to said cable supply point and a second end of said node closer to said deployed point when said node travels through said first and second restrictor.

5. The system of claim 1, further comprising:

pressure compensation means for reducing a pressure differential across said second restrictor.

6. The system of claim 5, wherein said control means causes said pressure compensation means to reduce said pressure differential when a node is disposed between said first and second restrictor.

7. The system of claim 5, wherein said pressure compensation means increases pressure in said portion of said tubular member such that a node in said portion of said tubular member experiences an increase in pressure at both a first end closer to said deployed point and a second end closer to said cable supply point.

8. The system of claim 5, wherein said pressure compensation means comprises:

at least one line connecting said medium and a portion of said tubular member between said first and second restrictor; and a control valve disposed in said line, said control valve having an open position which allows said medium to pass through said control valve, and a closed position which prohibits said medium from passing through said control valve.

9. The system of claim 1, further comprising:

a first sensor disposed along said tubular member between said cable supply point and said first restrictor for detecting a node;

a second sensor disposed along said tubular member between said first restrictor and said second restrictor for detecting a node; and wherein said control means receives output from said first and second sensor and controls said first and second restrictor based thereon.

10. The system of claim 1, further comprising:

a sensor for measuring a traveling speed of said cable; and wherein said control means controls said first and second restrictor based on output of said sensor.

11. The system of claim 1, wherein said first and second restrictor are single acting blowout preventers.

12. The system of claim 1, wherein said first and second restrictor are single acting multi-port blowout preventers.

13. The system of claim 1, wherein said first and second restrictor are double acting blowout preventers.

14. The system of claim 1, wherein said first and second restrictor are double acting blowout preventers each having a plurality of first and second ports, said first ports supplying hydraulic fluid to close said double acting blowout preventer, and said second ports supplying hydraulic fluid to open said double acting blowout preventer.

* * * * *